United States Patent
Izumi et al.

(10) Patent No.: US 6,181,761 B1
(45) Date of Patent: Jan. 30, 2001

(54) APPARATUS AND METHOD OF MONITORING REACTOR POWER OF REACTOR AT THE TIME OF STARTUP THEREOF

(75) Inventors: Mikio Izumi; Teruji Tarumi, both of Yokohama; Akira Yunoki, Tokorozawa, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/399,004

(22) Filed: Sep. 20, 1999

(30) Foreign Application Priority Data

Sep. 21, 1998 (JP) ................................. 10-266658
Sep. 2, 1999 (JP) ................................. 11-249232

(51) Int. Cl.[7] .......................... G21C 17/10; G21C 17/108
(52) U.S. Cl. ........................................ 376/254; 376/259
(58) Field of Search .............................. 376/254, 255, 376/259; 250/371, 388, 392, 395

(56) References Cited

U.S. PATENT DOCUMENTS

| | | | |
|---|---|---|---|
| 3,894,912 | * 7/1975 | Cohn | 176/19 R |
| 4,103,166 | 7/1978 | Niessel et al. | 250/391 |
| 4,170,733 | * 10/1979 | Weiss | 250/374 |
| 4,493,811 | * 1/1985 | Seki et al. | 376/254 |
| 4,623,508 | * 11/1986 | Glesius et al. | 376/254 |
| 5,076,998 | * 12/1991 | Graham | 376/254 |
| 5,114,665 | * 5/1992 | Ball et al. | 376/255 |
| 5,295,166 | * 3/1994 | Oda | 376/255 |

FOREIGN PATENT DOCUMENTS

| | | | |
|---|---|---|---|
| 0022692 | * | 2/1985 | (JP). |
| 3089197 | * | 4/1991 | (JP). |
| 405002094 | * | 1/1993 | (JP). |
| 9-274095 | | 10/1997 | (JP). |
| 1069004 | * | 1/1984 | (SU). |

* cited by examiner

Primary Examiner—Charles T. Jordan
Assistant Examiner—Kyongtaek K. Mun
(74) Attorney, Agent, or Firm—Finnegan, Henderson, Farabow, Garrett, & Dunner, L.L.P.

(57) ABSTRACT

The reactor start-up monitoring apparatus is provided with an SRNM detector, an analog amplifier, an N/D converter, a pulse measurement system, a Campbell measurement system and reactor power monitoring means. The pulse measurement system is provided with pulse counting means for counting the pulse number of output pulses of the detector from the first digital data from the converter, and pulse measurement evaluating means for converting the measurement value to reactor power and evaluating the reactor power. The Campbell measurement system is provided with sum operating means for adding a plurality of sampling values forming the first digital data from the converter and acquiring the second digital data having accuracy of bits more than those of the first digital data, power operating means for obtaining mean square values based on the second digital data and Campbell measurement evaluating means for converting the mean square values to reactor power and evaluating the reactor power.

15 Claims, 6 Drawing Sheets

APPARATUS AND METHOD OF MONITORING REACTOR POWER OF REACTOR AT THE TIME OF STARTUP THEREOF

BACKGROUND OF THE INVENTION

1. Field of the Invention

The present invention relates to a nuclear reactor start-up monitoring apparatus installed in, for example, a boiling-water reactor, particularly relates to the contrivance of the constitution of a digital apparatus for signal-processing of an output pulse from a radiation sensor disposed inside or outside of a reactor pressure vessel as data for measuring and monitoring reactor power.

2. Description of the Related Art

In a recent boiling-water reactor, there are provided with radiation sensors such as six to ten SRNM (Start up Ranged Neutron Monitor) detectors and 100 to 200 LPRM (Local Power Ranged Monitor) sensors installed in a reactor pressure vessel of the reactor, and a reactor power monitoring apparatus such as, for example, a start-up ranged monitor and power ranged monitor, for measuring and monitoring reactor power based on the detected signals by these radiation sensors.

Among them, the start up ranged neutron monitor (to be referred to as "reactor start-up monitoring apparatus" hereinafter) monitors reactor power at the time of reactor start-up or the like based on output pulses in accordance with neutron fluxes detected by the SRNM detectors. This apparatus performs processing for counting the number of output pulses of the SRNM detectors (to be referred to as "pulse measurement" hereinafter) in low reactor power ranges ($10^{-9}\%$ to $10^{-4}\%$) and performs processing for measuring the power of a fluctuabon component generated by the overlapping output pulses of the SRNM detectors, i.e., processing based on the principle of Campbell Law (to be referred to as "Campbell measurement" hereinafter) in high reactor power ranges ($10^{-5}\%$ to $10\%$).

An example of a reactor start-up monitoring apparatus conducting the pulse measurement and Campbell measurement as stated above will be described based on FIGS. 5 and 6.

A reactor start-up monitoring apparatus shown in FIG. 5 consists of an SRNM detector 100 detecting, as data for measuring reactor power, neutron fluxes in the reactor, an analog amplifier 101 amplifying and rectifying the detector output pulses, two signal processing systems connected in parallel to the signal output side, i.e., a pulse measurement system 102 and a Campbell measurement system 103, and reactor power evaluating (monitoring) means 104 for continuously monitoring/evaluating reactor power at least at time of starting up the reactor based on the processing results of the measurement systems 102 and 103.

Among those elements, the pulse measurement system 102 consists of a pulse wave height comparator 105 comparing the wave height value of the detector output pulse amplified by the analog amplifier 101 with a preset wave height value and counting the number of the detector output pulses having wave heights higher than the preset wave height value, and pulse measurement evaluating means 106 evaluating reactor power at the time of low power output by converting the counted pulse number to the output level of the reactor power.

Also, the Campbell measurement system 103 consists of a plurality of amplifiers (a small gain amplifier 107, a medium gain amplifier 108 and a large gain amplifier 109) amplifying and attenuating the detector output pulses amplified by the analog amplifier 101 under different conditions of a plurality of amplification factors and thereby limiting frequency bands to a specified band, a plurality of MS (Mean Square) operators 110, 111, 112 calculating mean square roots of the outputs of the amplifiers 107 to 109 and Campbell output evaluating means 113 for selecting an optimum value from the outputs of the operators 110 to 112 and for evaluating reactor power at the time of high power output.

In the reactor start-up monitoring apparatus stated above, if reactor power is low, pulse measurement is executed to adjust an output pulse to a signal level optimal to the pulse wave height comparator 105 and to accurately count the number of output pulses of the SRNM detector 100 by the analog amplifier 101. If reactor power is high, Campbell measurement is executed. When the Campbell measurement is executed, about five figures which is the measurement range thereof, cannot be covered by a single MS (Mean Square) arithmetic element 110, 111 or 112. Due to this, as shown in this example, a plurality of amplifiers 107 to 109 amplify the output of the SRNM detector 100 at different amplification factors to thereby cover the overall measurement range. In that case, an amplifier can be formed of a single logarithmic amplifier. Recently, however, there are many cases where divided amplifiers are employed as described above in light of temperature characteristics and the like, which constitution makes it possible to continuously monitor the wide measurement range of the reactor.

Nevertheless, since the above-stated reactor start-up monitoring apparatus is constituted to signal-process detector output pulses with an analog circuit, there is a possibility that counting only based on the magnitude of pulses may cause error measurement by the influence of discharge pulses generated as a result of discharge within the SRNM detector and noise erroneously generated by electromagnetic induction in the vicinity of the monitoring apparatus. As a result, this apparatus has a disadvantage in that information contained in the waveforms of the detector output pulses cannot be always utilized efficiently.

To deal with the above disadvantage, it is necessary to sufficiently shield signal cables and the like to prevent the induction of external noise at the time of execution. Additonally, as measures to prevent erroneous measurement due to the external noise during execution, there is a method of using not only pulse wave heights but also other waveform information since the waveforms of the erroneous pulses are, in most cases, different from those of signal pulses. Further, since a detector output pulse is changed by the leakage of gas sealed in the detector or by the abnormal distance between electrodes, it is possible to detect these abnormal states during measurement by monitoring waveforms. In the present system, however, it is necessary to, for example, diagnose the detector while precluding the system from monitoring targets. According to the present system, it is necessary to provide circuits dedicated to Campbell measurement and pulse measurement, respectively to simultaneously conduct the measurements, which results in larger-sized and complicated circuits. Due to this, the measurements are conducted by different hardware and, therefore, the apparatus shown in FIG. 5 has a problem that maintenance and inspection operations are carried out for the measurements, respectively. To solve this problem, it is desired that hardware parts are integrated, particularly, signal processing parts are integrated.

Considering the above, as means for solving the erroneous measurement problems with the analog circuit of that type, there is proposed a digital type reactor start-up monitoring apparatus for converting a detector output pulse to a digital signal and for conducting signal processing (e.g., in Japanese Patent Application Laid-Open No. 9-274095). Description will now be given to an example of this apparatus based on FIG. 6.

A digital type reactor start-up monitoring apparatus shown in FIG. 6 consists of an SRNM detector 100, an analog amplifier 101, as in the case of the above apparatus, a pulse measurement system 102 and a Campbell measurement system 103 connected to the signal output side in parallel, and reactor power evaluating (monitoring) means 104, such as a monitor, for continuously monitoring reactor power at the time of reactor start-up based on the measurement results of the measurement systems 102 and 103.

Among the elements, the pulse measurement system 102 consists of the first A/D converter 120 sampling the detector output pulse amplified by the analog amplifier 101 at intervals shorter than the pulse width, pulse counting means 121 for counting the number of detector output pulses from the obtained sampling data and pulse measurement evaluating means 106 for converting the counted pulse number to a reactor power level and evaluating reactor power at the time of low power output. The pulse counting means 121 performs arithmetic processing to not only pulse wave height values but also other features using sampling data and recognizes output pulses. Thus, it is possible to count only the output pulses and to remove different signals such as noise.

In addition, the Campbell measurement system 103 consists of a plurality of analog amplifiers (a small gain amplifier 107, a medium gain amplifier 108 and a large gain amplifier 109) amplifying and attenuating the detector output pulse amplified by the analog amplifier 101 under different conditions of a plurality of amplification factors, at least one, the second A/D converter 122 A/D converting the outputs of the respective amplifiers 107 to 109 and Campbell measurement evaluating means 113 for calculating a mean square value corresponding to the power of a specific frequency band using the obtained sampling data and then evaluating reactor power at the time of high power output. Among them, the Campbell measurement evaluating means 113 limits a frequency band after A/D conversion and operates the mean square value. Since the operation of the means 113 can be processed by software-based calculation, the measurement frequency band can be advantageously easily changed.

The above-stated conventional digital type reactor start-up monitoring apparatus has, however, the following problems.

1): The pulse measurement and Campbell measurement differ in necessary sampling cycle (interval) and A/D conversion accuracy and require individual A/D converters, respectively.

That is, in pulse measurement, it is required that a sampling cycle is shorter than the pulse width of a detector output pulse. Since the width of the output pulse is about 100 nsec, an N/D converter capable of digitizing a pulse with 20 $MH_z$ is required for the pulse measurement. For example, a commercially available A/D converter having accuracy of about eight to ten bits is employed.

In Campbell measurement, by contrast, the measurement band is normally 1 $MH_z$ or less and an A/D converter having a sampling cycle of about 2 $MH_z$ is, therefore, required. Besides, to broaden the measurement range, the accuracy of the converter needs to be higher than that of the above-stated N/D converter for pulse measurement. For example, a commercially available AND converter having accuracy of about 16 bits is employed.

Meanwhile, Campbell measurement, as in the case of the conventional analog type apparatus described above, covers a measurement range as wide as five figures and a plurality of analog amplifiers are, therefore, required.

As stated above, due to the need to prepare a plurality of A/D converters and analog amplifiers, the overall constitution of the conventional digital type reactor start-up monitoring apparatus becomes disadvantageously complicated.

2): Since Campbell measurement has a sampling cycle of about 2 $MH_z$ as stated above, it is necessary to remove frequency components of 1 $MH_z$ or more before sampling according to the sampling theorem. For that reason, an antialiasing analog filter is normally provided.

If such an antialiasing analog filter is provided, however, analog filtering characteristics play a major role and digital response expected by the digital type reactor start-up monitoring apparatus cannot be disadvantageously realized. That is to say, since power operation is performed by the Campbell measurement system in the digital type reactor start-up monitoring apparatus in a frequency band of about 100 $kH_z$ to 400 $kH_z$, a digital filter instead of an analog filter is expected to be adopted as the band limiting filter to enhance time response and performance against external noise.

3): If a digital filter is used as a band limiting filter for Campbell measurement, it is necessary to execute a simple method capable of real-time processing operation using the digital filter. This is because the present Campbell measurement elements do not have enough operation speeds.

4): In regard to an algorithm for digitally sampling pulse waveforms and selecting a detector output pulse from the sampling values, it is difficult to make waveform selection in a real-time manner at a cycle of 100 nsec or less as in the case of the digital filter for Campbell measurement. To deal with this, a method for simplifying a waveform selection algorithm is desired.

SUMMARY OF THE INVENTION

The present invention has been made in light of the above conventional circumstances. It is an object of the present invention to construct a relatively simple apparatus structure and to construct a relatively simple algorithm capable of effectively utilizing the characteristics of a digital filter and capable of executing waveform selection for pulse measurement and digital operation for Campbell measurement in a real-time manner.

The above object can be achieved by the present invention, in one aspect by providing an apparatus for monitoring reactor power of a reactor at least at the start-up time thereof, comprising:

a radiation sensor for detecting radiation doses associated with the reactor power as electrical signals having pulse components according to the radiation doses;

analog filter means for filtering electrical signals having frequency components in a certain frequency band from the electrical signals detected by the radiation sensor;

digital conversion means for converting the electrical signals having the frequency components filtered by the analog filter means to first digital data with an accuracy of certain bits on sampling intervals shorter than a pulse width of the pulse components;

pulse measurement means for counting the number of pulses of the pulse components in a predetermined frequency band based on the first digital data converted by the digital conversion means;

sum operating means for adding a plurality of sampling values forming the first digital data based on preset sum operation conditions so as to obtain second digital data having accuracy having more bits than those of the plurality of sampling values forming the first digital data converted by the digital conversion means;

Campbell measurement means for calculating mean square values corresponding to power of fluctuation components caused by overlap of the pulse components in a predetermined frequency band based on the second digital data obtained by the sum operating means; and reactor power monitoring means for continuously monitoring information on the reactor power based on the number of pulses counted by the pulse measurement means and the mean square values calculated by the Campbell measurement means.

Among those elements, the radiation sensor may be, for example, a neutron detector (an SRNM detector, an LPRM detector or the like) detecting a neutron flux as radiation doses. The analog filter means may be, for example, an analog circuit including an analog filter amplifier (analog amplifier) for limiting and rectifying the output frequency band of the electrical signals from the radiation sensor to a range suited for digital conversion conducted in a later stage. The digital conversion means may be, for example, an A/D converter with sample holding function, sampling the electrical signals from the analog filter means at certain intervals and digitally converting the sampled signals.

The pulse measurement means consists of, for example, pulse counting means for counting the number of pulses emitted from the radiation sensor based on the output of the digital conversion means and pulse measurement evaluating means for evaluating the reactor power based on the output of the pulse counting means.

The Campbell measurement means consist of, for example, sum operating means for obtaining a sum by adding outputs of the digital conversion means and outputting the value at certain intervals, power operating means for obtaining mean square values in a certain frequency band from the output of the sum operating means and Campbell output evaluating means for evaluating the reactor power based on the mean square values.

It is preferred that the sum operating means includes means for outputting the second digital data to the Campbell measurement means with output accuracy of more bits than those of the first digital data.

As stated above, by setting the number of output bits indicating the output accuracy of the sum operating means than that in case of sampling by the digital conversion means, it is possible to transmit the bit number of measurement accuracy enhanced by the sum operation of the sum operating means to the means for obtaining mean square values in the later stage without rounding down the bit number.

It is preferred that the sum operating means includes means for outputting the second digital data to the Campbell measurement means at longer output time intervals than sampling intervals for the digital conversion means.

As stated above, by setting the output intervals of the sum operating means to be longer, e.g., 10 to 20 times longer, than the sampling intervals for the digital conversion means, it is possible to set the output frequency for the sum operation to be optimal to a repeatable cycle since the frequency band necessary for Campbell measurement is, for example, not more than $\frac{1}{20}$ to $\frac{1}{10}$ of the frequency band necessary for pulse measurement. Thus, operation algorithms for Campbell measurement can be simplified.

It is preferred that the sum operating means is means for adding a plurality of sampling values forming the first digital data under a plurality of sum operating conditions having different numbers of added values as the sum operation conditions.

This sum operating means averages a plurality of sampling values forming the first digital data by the individually different sampling numbers. In this way, if the sum operating means is employed instead of the conventional signal amplifying means in the front stage of the digital conversion means (such as A/D converter) and the sampling number (the number of added values) for the sum operation is changed, then it is possible to further enhance the accuracy of the sum operating means and to measure signals of different output levels of the reactor power.

It is preferred that the sum operating means is means for adding a plurality of sampling values forming the first digital data under a plurality of sum operating conditions within a certain time as conditions for the sum operation.

This sum operating means conducts a plurality of sum operations at individually different sampling intervals within a certain time. In this way, if the sum operating means adds sampling data at different time intervals within a certain time instead of adding continuous sampling numbers, it is possible to variably set the accuracy of the sum operating means.

It is preferred that the Campbell measurement means includes Campbell output evaluating means for evaluating the mean square values in a plurality of frequency bands based on the second digital data from the sum operating means, and Campbell signal discriminating means for selecting normal values from the mean square values in the plurality of frequency bands by the Campbell output evaluating means and supplying the normal values to the reactor power monitoring means as information on the reactor power.

As stated above, if the mean square values in different frequency bands are operated, the frequency bands indicating abnormality due to the induction of noise and the like compared with other signals are removed and only the remaining normal data are used, then it is possible to monitor more normal reactor power using the reactor power monitoring means.

It is preferred that the digital conversion means is means for converting the electrical signals having the frequency components from the analog filter means to the first digital data at sampling intervals corresponding to 1/n of the pulse width the pulse components, where n is a positive number. The pulse measurement means includes means for obtaining an operation value Out(k) at the sampling intervals, selecting the pulse components based on the Out(k), and counting the number of pulses of the pulse components selected, the Out(k) being operated based on the following formula;

$$\text{Out}(k)=C(0)\times S(k)+C(1)\times S(k-1)+C(2)\times S(k-2)+ \ldots +C(k-n+1)\times S(k-n+1),$$

where $S(k)$ is a k-th sampling value among a plurality of sampling values forming the first digital data from the digital conversion means, $S(k-1)$, $S(k-2)$, ..., $S(k-n+1)$ are sequential sampling values before the $S(k)$, the number of the sampling values is determined by said positive number n, and $C(0)$, $C(1)$, $C(2)$, ..., $C(k-n+1)$ are constants individually allotted to the sampling values $S(k)$, $S(k-1)$, $S(k-2)$, ..., $S(k-n+1)$.

As stated above, if the intervals of the digital conversion means are set at 1/n of the pulse width of the pulse wave and operation based on the operation formula is performed, then it is possible to count only the output pulses using only the operation of sum of products capable of conducting high-speed processing by the digital signal processing, and to execute pules measurement in a real-time manner.

It is preferred that the digital conversion means is means for converting the electrical signals having the frequency components from the analog filter means to the first digital data at sampling intervals, the sampling intervals being not less than one fourth of and not more than one third of the pulse width of the pulse components. The pulse measuring means includes means for obtaining an operation value Out(k) at the sampling intervals, selecting the pulse components based on the Out(k), and counting the number of pulses of the pulse components selected, the Out(k) being operated based on the following formula;

$$Out(k) = -a \times S(k-3) + b \times S(k-2) + c \times S(k-1) - d \times S(k),$$

where S(k) is a k-th sampling value among a plurality of sampling values forming the first digital data from the digital conversion means, S(k−1), S(k−2) and S(k−3) are sequential three sampling values before the S(k), and a, b, c and d are constants individually allotted to the four sampling values S(k), S(k−1), S(k−2) and S(k−3).

As stated above, if the sampling intervals of the digital conversion means are set at one-third to one-fourth of the pulse width of the pulse wave from the radiation sensor, operation based on the above operation formula is performed, pulse waves are selected and the pulse number is counted, then it is possible to count only the pulses having a pulse width equal to that of the output pulse from the radiation sensor.

It is preferred that the digital conversion means is means for converting the electrical signals having the frequency components from the analog filter means to the first digital data at sampling intervals, the sampling intervals being not less than one third of and not more than a half of the pulse width of the pulse components. The pulse measuring means includes means for obtaining an operation value Out(k) at the sampling intervals, selecting the pulse components based on the Out(k), and counting the number of pulses of the pulse components selected, the Out(k) being operated based on the following formula;

$$Out(k) = -a \times S(k-2) + 2 \times b \times S(k-1) - c \times S(k),$$

where S(k) is a k-th sampling value among a plurality of sampling values forming the first digital data from the digital conversion means, S(k−1) and S(k−2) are sequentially two sampling values before the S(k), and a, b and c:are constants individually allotted to the three sampling values S(k), S(k−1) and S(k−2).

As stated above, if the sampling intervals of the digital conversion means are set at a half to one-third of the pulse width of the pulse wave from the radiation sensor, operation based on the above operation formula is performed, pulse waves are selected and the pulse number is counted, then it is possible to count only the pulses having a pulse width equal to that of the output pulse from the radiation sensor.

It is preferred that the digital conversion means is means for converting the electrical signals having the frequency components from the analog filter means to the first digital data at sampling intervals, the sampling intervals being 1/n of the pulse width of the pulse components, where n is a positive number. The pulse measuring means includes means for obtaining an operation value Out(k) at the sampling intervals, selecting the pulse components based on the Out(k), and counting the number of pulses of the pulse components selected, the Out(k) being operated based on the following formula;

$$Out(k) = -a \times S(k-2) + 2 \times b \times S(k-1) - c \times S(k),$$

where S(k) is a k-th sampling value among a plurality of sampling values forming the first digital data from the digital conversion means, S(k−1) and S(k−2) are sequentially two sampling values before the S(k), and a, b and c:are constants individually allotted to the three sampling values S(k), S(k−1) and S(k−2).

By using the first operation value Out 1(k), it is possible to detect the first characteristics of the pulse wave, e.g., whether or not pulses are present according to the change of pulse wave heights at the pulse rise time. At the same time, by using the second operation value Out 2(k), it is possible to detect the second characteristics of the pulse wave, e.g., whether or not pulses are present according to the change of pulse wave heights at the pulse fall time. By counting pulses based on these plural operation values, it is possible to accurately count only the output pulses from radiation.

It is preferred that the obtaining means is means for obtaining a plurality of operation values including third or following operation values in addition to the first and second operation values, based on the same formula as in the case of obtaining the first and second operation values at the sampling intervals while changing the constants.

By using plural operation values other than the first and second operation values, it is possible to detect the characteristics of other pulses, e.g., whether or not pulses are present according to the pulse width. Also, it is possible to accurately count only the pulses from the radiation sensor using these plural operation values.

It is preferred that the Campbell measurement means comprises cycle data removal means for removing data of a certain predetermined time interval from the second digital data of the sum operating means; and Campbell evaluating means for operating the mean square value from residue data not removed by the cycle data removal means in the frequency band higher than a frequency band of the data removal cycle and correcting and outputting the mean square value in accordance with a ratio of data removed from the second digital data.

According to this invention, the data is cydically removed from the second digital data, i.e., zero data replaces the second digital data, thereby removing a cydically induced noise component from the data series. The band limiting digital filter processing is carried out to obtain the mean square value of the data in a certain frequency band, and the mean square value in a frequency band higher than the frequency band in which the data is removed, is calculated. At this moment, by multiplying the mean square value by a coefficient determined by a ratio of the cydically removed data to the original entire data and obtained from the logic calculation of the digital filter, the value is made the same as that obtained as a result of processing all data. By doing so, Campbell output free from the influence of noise and a more reliable reactor start-up monitoring apparatus can be provided.

It is preferred that the cycle data removal means comprises noise data addition means for discriminating data of not less than or not more than a certain value by the digital conversion means, determining the data as noise data and adding noise information on the noise data; and Campbell evaluating means for removing the data if the noise information is included in the second digital data and correcting and outputting a mean square value of the noise data in accordance with the ratio of the removed data to the second digital data.

According to this invention, it is determined whether or not noise is present based on the magnitude of the first digital data and the information is added to one bit of the digital data using, for example, a flag indicating the noise added data The Campbell evaluation means determines the flag-added digital data as noise data and processing for operating a mean square value in a certain frequency band is carried out while removing the noise data. By doing so, Campbell output free from the influence of noise can be obtained and a more reliable reactor start-up monitoring apparatus can be provided.

It is preferred that the cycle data removal means comprises noise monitoring means for evaluating the presence or absence of noise induced by an earth or the like and a cycle of the noise; and Campbell evaluating means for removing the noise data from the second digital data if the noise information is included in the second digital data in accordance with the noise cycle evaluated by the noise monitoring means and noise recognition timing, and for correcting and outputting a mean square value of the removed data in accordance with the ratio of the removed data to the second digital data.

According to this invention, the cycle/occurrence timing of the noise induced to other places such as an earth is monitored. At this being/cycle, noise data out of the second digital data is determined and the noise data is removed. By doing so, Campbell output free from the influence of noise can be obtained and a more reliable reactor start-up monitoring apparatus can be provided.

It is preferred that the pulse measurement means comprises analog type pulse comparison means used if a wave height value is not less than or not more than a certain value; and digital type pulse counting means for counting a pulse number based on the digital data; and means for counting only the pulses of the detector output obtained by removing measured noise from determination results of both the analog type pulse comparison means and the digital type pulse determination means.

According to this invention, a noise pulse or a signal pulse is digitally discriminated and the measurement result of the analog type pulse measurement means is corrected, thereby making it possible to measure a pulse more accurately.

As described so far, due to the constitution in which the sum operating means is provided, the present invention can enhance sampling data accuracy and reduce the sampling cycle. Thus, it is possible to reduce the number of AND converters, amplifiers and the like compared with the conventional apparatus and to construct hardware constitution more simply. With the same constitution, it is possible to set the frequency of an antaliasing analog filter to be the same as that for pulse measurement. This makes it possible to realize digital response and select a frequency band by the filter processing in Campbell measurement and to thereby improve noise resistance and response characteristics.

In preferred embodiments, other advantages will be detailed hereinafter.

Accuracy improvement advantage by the sum operating means can be realized with a further minimum bit number through hardware, thereby simplifying hardware constitution.

Operation algorithms for Campbell measurement can be simplified, thereby in real time conducting band pass digital filter processing, square operation and the like in Campbell measurement.

Changing the number of sum operations can enhance measurement accuracy. Algorithms processing in a simplest manner and algorithms making time response characteristics equal can be provided. These algorithms allow measurement accuracy to enhance more easily and the number of a plurality of amplifiers for Campbell measurement to be reduced.

The Campbell signal discriminating means can remove external noise, thereby enhancing apparatus reliability.

Only output pulses with less sampling number can be counted, thereby measuring pulses through software in a real-time manner and conducting measurement without malfunction caused by external noise and the like.

Therefore, the present invention can provide a reactor start-up monitoring apparatus which can make full use of the advantageous features of the digital filter and incorporate simple algorithms for allowing waveform selection and Campbell measurement digital operation in a real-time manner, with simple hardware constitution, good noise resistance and high reliability.

The above object can be achieved to the present invention, in the another aspect by providing a method of monitoring reactor power of a reactor at least at the startup time thereof, comprising the steps of:

detecting radiation doses associated with the reactor power as electrical signals having pulse components according to the radiation doses;

filtering electrical signals having frequency components in a predetermined frequency band from the electrical signals detected by the detecting step;

converting the electrical signals having the frequency components filtered by the analog filter means to first digital data with an accuracy of certain bits on sampling intervals shorter than a pulse width of the pulse components;

counting the number of pulses of the pulse components in a predetermined frequency band based on the first digital data converted by the converting step;

adding a plurality of sampling values forming the first digital data under preset sum operation conditions so as to obtain second digital having accuracy having more bits than those of the plurality of sampling values forming the first digital data converted by the converting step;

calculating mean square values corresponding to power of fluctuation components caused by overlap of the pulse components in a predetermined frequency band based on the second digital data obtained by the adding step; and monitoring the reactor power based on the number of pulses counted by the counting step and the mean square values calculated by the calculating step.

DESCRIPTION OF THE PREFERRED EMBODIMENT

Now, the embodiment of a reactor start-up monitoring apparatus according to the present invention will be described with reference to drawings.

Figure 1:
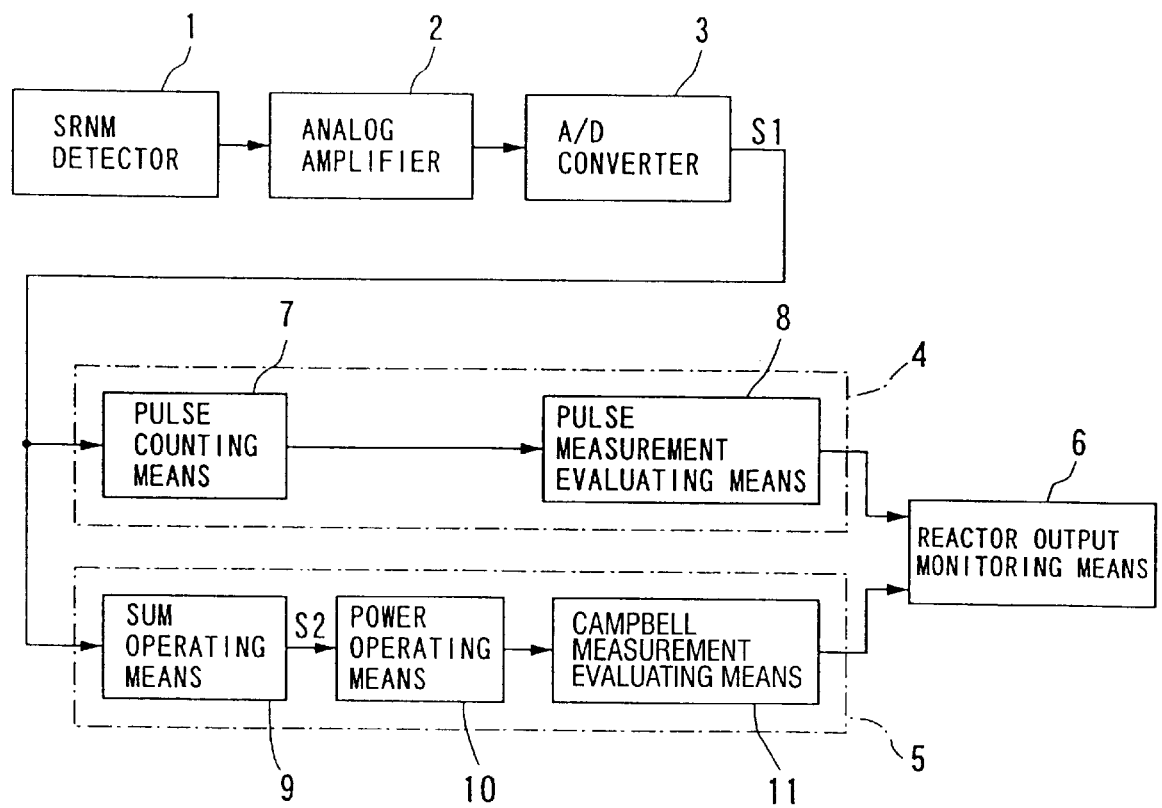
FIG. 1 shows a schematic functional block diagram for describing an embodiment of a reactor start-up monitoring apparatus according to the present invention.

A reactor start-up monitoring apparatus shown in FIG. 1 consists of an SRNM detector 1 (radiation sensor) measuring reactor power, i.e., a neutron flux in a reactor, an analog amplifier 2 (analog filter means) limiting and rectifying the output frequency band of an output pulse from the SRNM detector 1 and functioning as an antialiasing filter, an A/D converter (digital conversion means) 3 sampling an analog signal from the analog amplifier 2 at preset fixed sampling intervals and converting the signal to the first digital data SI, two signal processing systems, i.e., a pulse measurement system (pulse measuring means) 4 and a Campbell measurement system (sum operating means and pulse measuring means) 5, connected to the output side of the A/D converter 3 in parallel and reactor power monitoring means 6, such as a monitor, for continuously monitoring information on reactor power based on the measurement data from the both measurement systems 4 and 5.

Among them, the pulse measurement system 4 consists of pulse counting means 7 for counting the output pulses of the SRNM detector 1 from the first digital data S1 of the A/D converter 3 and pulse measurement evaluating means 8 for evaluabng reactor power from the count value of the pulse counting means 7.

The pulse counting means 7 consists of an operating unit executing processing along a detector output pulse selection algorithm preset in accordance with, for example, the sampling intervals of the N/D converter 3. Now, the algorithms executed by this operating unit will be described with reference to FIG. 2.

Figure 2:
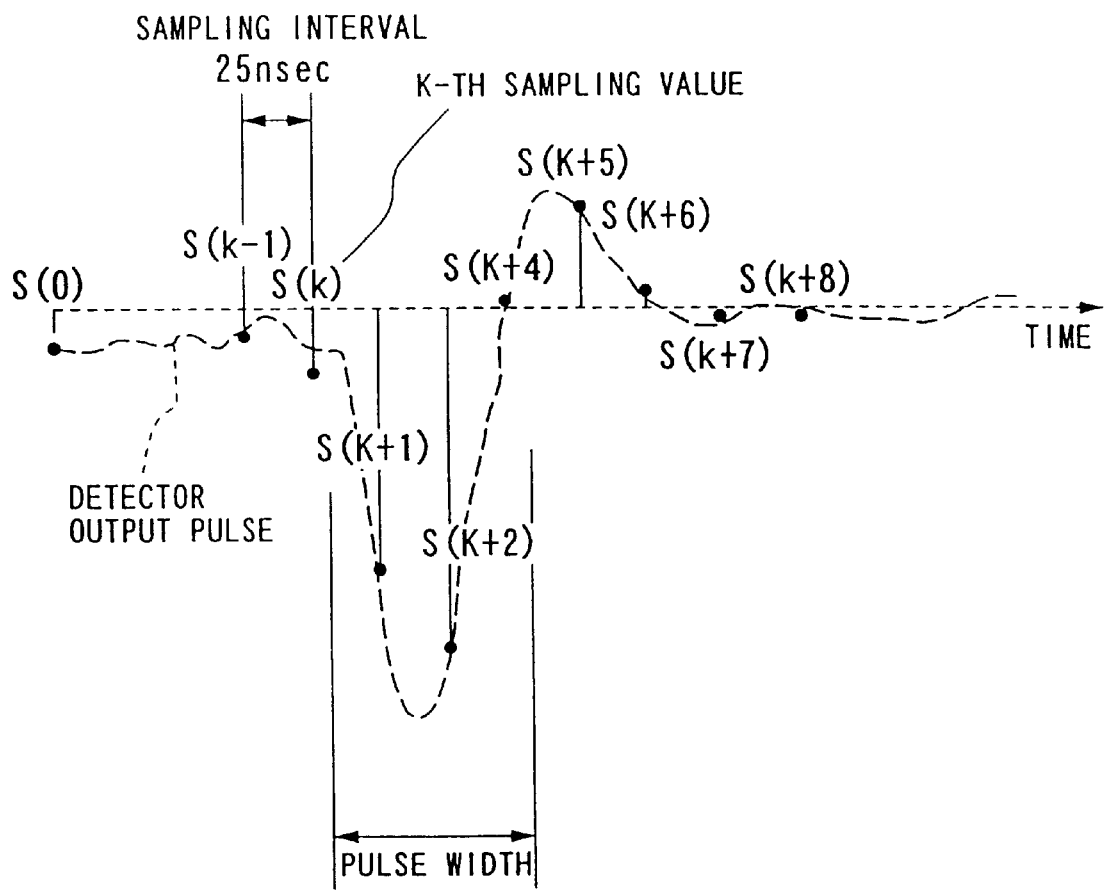
FIG. 2 shows a graph for describing the relationship between the SRNM detector output pulse and sampling.

FIG. 2 is a view for describing the relationship between the waveform of an SRNM detector output pulse and a sampling interval. Here, reference symbol S(k) in FIG. 2 denotes k-th sampling value out of a plurality of sampling values forming the first sampling data, and S(k+1) denotes the next sampling value.

In this case, if the sampling interval is shorter, more waveform information can be extracted, thereby making it possible to accurately count only the detector output pulses with other error signals such as external noise removed. To carry out the processing in a real-time manner, it is desirable that they can be realized with a minimum sampling number.

The inventor of the present invention conducted studies in view of the above respects and obtained the concept that if a sampling interval is 1/n (where n is a positive number), preferably a half to one-fourth of the pulse width (about 80 nsec) of a detector output pulse (the sampling interval of about 25 nsec), then it is possible to accurately discriminate (select) only the detector output pulses from among those including other noise signals of different pulse widths. This concept will be described for each sampling interval of the A/D converter 3 hereinafter.

1): First, if the sampling interval of the NVD converter is about one-third of the pulse width, that is, the sampling interval of 25 nsec shown in FIG. 2, the following operation is conducted to obtain k-th Out(k) for each sampling interval using the k-th sampling value S(k), three sampling values S(k−3), S(k−2) and S(k−1) before the k-th sampling value and positive constants a, b, c and d:

$$Out(k) = -a \times S(k-3) + b \times S(k-2) + c \times S(k-1) - d \times S(k)$$

And the number of Out(k) higher than a preset value is counted, whereby it was confirmed that only the detector output pulses can be selected and counted.

2): Likewise, if the sampling interval of the ND converter 3 is an integral multiple j of about one-third of the pulse width, the following operation is conducted to obtain k-th Out(k) at the intervals of about one-third of the pulse width:

$$Out(k) = -a \times S(k-3 \times j) + b \times S(k-2 \times j) + c \times S(k-j) - d \times S(k)$$

And the number of the operation values higher than a preset value is counted, whereby it was confirmed that only the detector output pulses can be selected and counted.

3): Likewise, if the sampling interval of the AND converter 3 is one-third to one-fourth of the pulse width, the positive constants of a, b, c and d are adjusted to values other than 1, whereby the same selection and counting are possible.

4): Likewise, if the sampling interval of the A/D converter 3 is a half to one-third of the pulse width, the previous two sampling values are used for the first sampling data and the following operation is conducted:

$$Out(k) = -a \times S(k-2 \times j) + 2 \times b \times S(k-1 \times j) - c \times S(k)$$

As a result, it was found that the same selection and counting are possible.

5): In addition, if the sampling interval is about one-third of the pulse width, that is, the sampling interval of 25 nsec shown in FIG. 2, as a method of counting the number of pulses more accurately than a case of 1) above, a detector pulse selection algorithm was contrived. Namely, the following operation is conducted to individually obtain two operation values Out1(k) and Out2(k) using the previous sampling values S(k−3), S(k−2) and S(k−1) and positive constants a, b, c and d:

$$Out1(k) = -a \times S(k-3) + b \times S(k-2)$$

$$Out2(k) = +c \times S(k-1) + d \times S(k)$$

Then, if the two operation values fall within a range of the predetermined set value, it is determined that the pulse is a detector pulse.

In this case, Out1(k) reflects the feature of pulse rise characteristics. In case of the detector output pulse shown in FIG. 2, a negative value of Out1(k) is lower than a pulse wave height value. Out2(k) reflects the feature of pulse fall characteristics. A negative value of Out2(k) is lower than a pulse wave height value.

Then, determination values of negative values higher than the noise level are set for the two operation values Out1(k) and Out2(k), respectively. If each of the operation values indicates a value lower than the corresponding determination value, the pulse is determined as a detector output pulse. In this way, if waveform selection algorithms, in which a plurality of arithmetic formulas for pulse selection are set based on the characteristics of the pulse waveforms in the respective stages and a pulse is determined as a detector output pulse if the respective operation values satisfy the conditions as a pulse, are adopted, then more accurate pulse measurement can be conducted.

Furthermore, since the method of digitally measuring the pulse is used and a logic for discriminating a noise component is conversely provided, it is possible to make more accurate pulse measurement by comparing the measurement result of the conventional analog measurement means with the digital measurement logic result of the present invention.

It is noted that if the sampling interval of the N/D converter 3 is about one-fourth of the output pulse width of 80 nsec, the output frequency band of the analog amplifier 2 may be limited to about 20 $MH_z$ or less. If the pulse width of the detector output pulse is 80 nsec, an amplifier having a frequency band of up to about 10 $MH_z$ is normally used to amplify this output pulse. It was found that the above conditions can be satisfied by the operation values without adding any special filter.

The pulse counting means 7 counts the number of pulses through waveform processing based on at least one of the waveform selection algorithms 1) to 5) above, and outputs the result to the pulse measurement evaluating means 8.

The pulse measurement evaluating means 8 converts counting data from the pulse counting means 7 to a reactor power value, sequentially operates a set value to be compared with the magnitude of the operation value out(k) by the pulse counting means 7 as data for monitoring information on reactor power if necessary, counts counting frequency with respect to the set value and thereby monitors the occurrence frequency distribution of the operation value out(k), i.e., wave height distribution. The wave height distribution in this case does not indicate the wave heights of output pulses in a strict sense; however, it can be treated correspondingly and used to determine whether or not the output pulse of the SRNM detector 1 is normal.

The Campbell measurement system 5 consists of sum operating means 9 for adding a plurality of sampling values serving as the first digital data from the A/D converter 3 shown in FIG. 1 to obtain a sum value and outputting the value at predetermined intervals, power operating means 10 for operating a mean square value in a predetermined frequency band from the output of the sum operating means 9, i.e., operating power and Campbell measurement evaluating means 11 for converting the operation result of the power operating means 10 to a reactor power and evaluate it.

As the AND conversion performance required by the earlier stage of the Campbell measurement 5, an A/D converter having a bit accuracy higher than that of a low-bit A/D converter (about eight to twelve bits for currently commercially available converters) used for the above-stated pulse measurement system 4 is desired to broaden the measurement range as stated above. The inventor of the present invention contrived a method of generating high accuracy data even with the Campbell measurement while using the first digital data from the A/D converter 3 with lower bit accuracy for use in the pulse measurement, i.e., contrived use of the above-stated sum operating means 9.

This sum operating means 9 can enhance measurement accuracy by changing (adjusting) conditions of the number of added values so that the sum of, for example, two eight-bit data has accuracy of nine bits. By utilizing these characteristics, an A/D converter 3 common to the pulse measurement system 4 and the Campbell measurement system 5 can be employed.

Further, in case of the conventional analog type apparatus (see FIG. 4), a plurality of Campbell measurement gain amplifiers are required in the front stage of the RMS operators. According to the present invention, these amplifiers are not needed since the processing for adjusting the number of added values by the above-stated sum operating means 9 can take the part of the amplifiers. This is because if three values having different number of added values are set by means of software in advance, the same operation of the Campbell measurement as that in the analog type apparatus can be conducted. It is preferable that the analog amplifier 2 to be used has low noise characteristics so that signal components are higher than the noise level.

The sum operating means 9 conducts sum operation a plurality of sampling values forming the first digital data S1 from the AND converter 3 under at least one of the two selection and operation conditions (sum operating conditions), i.e., a condition for adding previous sampled data at 25 nsec (40 $MH_z$ intervals by the number equal to the sum number and a condition for thinning out sampling data within a certain distance to change the number of added values and then adding them. Then, the means 9 acquires the second digital data S2 having higher bit accuracy than that of the first digital data S1 and outputs the data S2 to the power operating means 10 on a certain output cycle. As for the two selection and operation conditions stated above, the former is characterized in that easy algorithms are provided and the latter is characterized in that time response in Campbell measurement is not affected by the number of added values.

The output cycle of this sum operating means 9 is determined by the band for power (mean square value) operation in Campbell measurement. Normally, a cycle of 1 $MH_z$ suffices. Since power operation is normally conducted in a low frequency band of several tens of hertz or a high frequency band of several hundreds of hertz, e.g., in a high frequency band of 100 $kH_z$ to 400 $kH_z$ for the present reactor start-up monitoring monitor, sampling having a cycle of about twice (about 1 $MH_z$ cycle in this example) as long as the maximum frequency (400 $kH_z$ in this example) as a band-pass filter is required.

The power operating means 10 conducts band limitation, that is, band pass filter processing to the second digital data S2 from the sum operating means 9 to thereby obtain mean square values and operates the power in a preset frequency band. Here, the sampling cycle is, as stated above, decreased at the sum operating means 6. Due to this, as for an aliasing analog filter, it is enough to prepare only a filter for band limitabon to 10 $MH_z$ or less for the above-stated analog amplifier 2. Although an antaliasing filter is used to limit the frequency band to 500 $kH_z$ or less for normal sampling of 1 $MH_z$ or less, the sum operating means 9 provided in the earlier stage already takes this part, the antaliasing filter is not needed.

Figure 3:
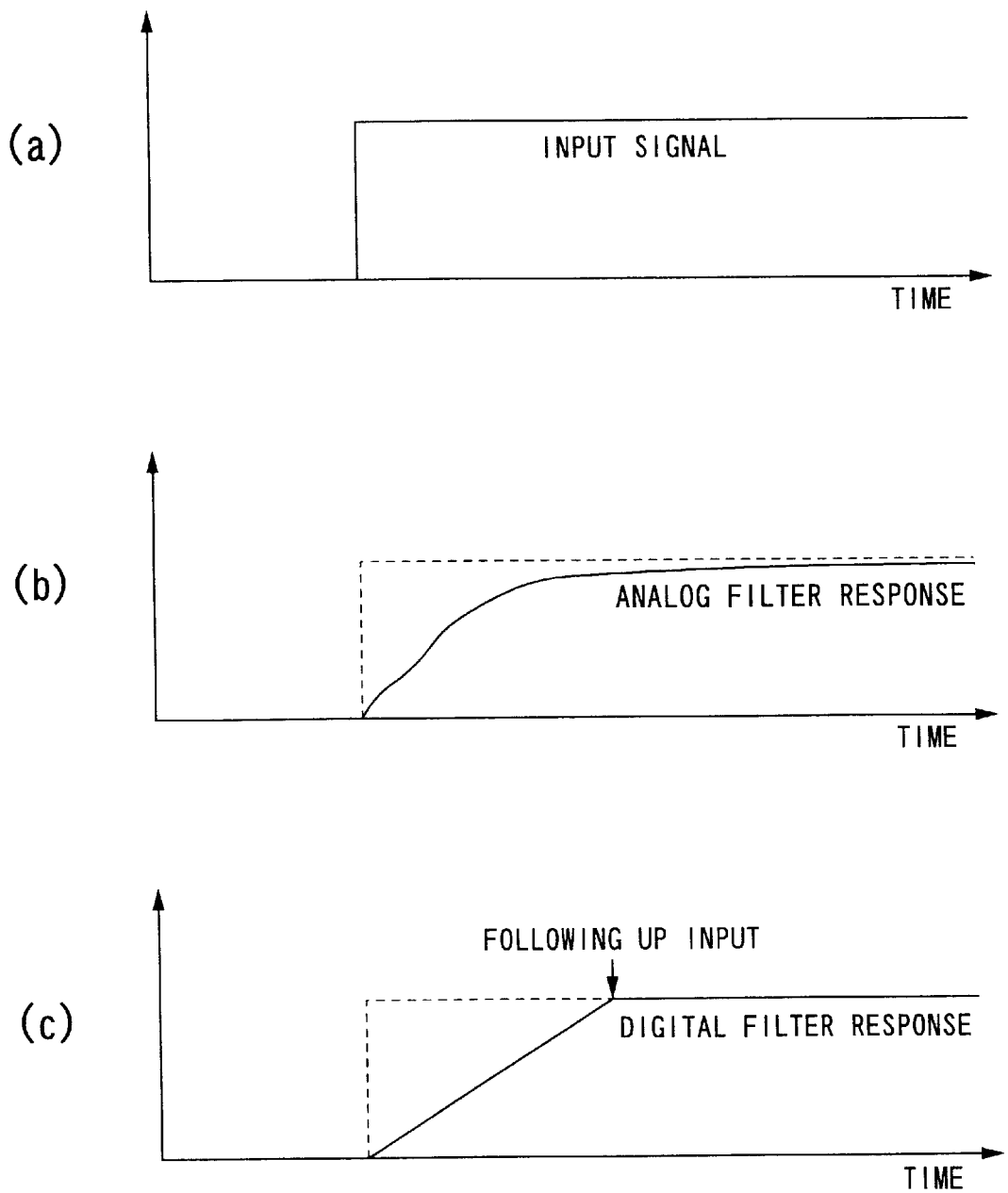
FIGS. 3(a) through 3(c) show graphs for describing and comparing digital filter response and analog filter response.

FIG. 3 is a view for describing the response characteristics of an input signal while comparing those of an analog filter with those of a digital filter. In case of an input signal shown in FIG. 3(a), the signal reaches a true value within a limited period of time if a digital filter is used (constitution without a feedback loop) as shown in FIG. 3(c), it takes a while for the signal to reach a true value if an analog filter is used as shown in FIG. 3(b). Thus, if a digital filter without feedback is employed for the sum operating means 9, it is possible to improve response characteristics compared with a conventional case where an analog filter is used.

The power operating means 10 conducts integral processing after square operation. A band for the integral processing is determined to be about 50 Hz or less based on the time response characteristics in Campbell measurement. It is noted that as a result of studying a method of minimizing operation time, it was confirmed that it is enough to conduct band limitation and square operation in a cycle twice as long as a required frequency, i.e., a cycle of 100 HZ. Thus, it is possible to reduce operation quantity in the Campbell measurement system 5 (power operating means and Campbell measurement evaluating means 11) and to realize real-time processing by using high-speed operation elements.

Accordingly, in this embodiment, by providing the Campbell measurement system 5 with the sum operating means 9, it is possible to use an A/D converter 3 common to pulse measurement and Campbell measurement. Also, by changing and adjusting the number of added values of the sum operating means, it is possible to reduce the number of a plurality of amplifiers used in the conventional Campbell measurement, with the result that the apparatus constitution can be greatly simplified compared with the conventional digital type apparatus.

In addition, since the sum operating means 9 is provided, it is enough to prepare a filter having a high cutoff frequency suffices as an antialiasing analog filter. Due to this, it is possible to provide time response characteristics in Campbell measurement capable of following up a true value within a digitally limited period of time.

Furthermore, the power operating means 10 and the Campbell measurement evaluating means 11 may conduct band pass filter processing and mean square processing according to their output cycles, so that operational load can be further reduced and real-time processing is thereby possible.

As for the pulse measurement system 4, since simple algorithms for digitally sampling pulse waveforms and selecting detector pulses from the obtained sampling values have been developed, it is possible to select digitally sample pulses while those having different pulse widths are not counted and to realize pulse measurement with less erroneous counting.

By doing so, it is possible to provide a reactor start-up monitoring apparatus in which simple algorithms capable of making full use of the characteristics of the digital filter and capable of conducting waveform selection and the digital operation for Campbell measurement in a real-time manner are installed, with simple apparatus constitution.

As an applied example in which the characteristics of the digital filter as well as the advantage of increasing the range of the software design is used, the apparatus may be provided with means for operating mean square values in a plurality of frequency bands and selecting normal ones therefrom.

For example, the apparatus may be additionally provided with a Campbell signal discriminating unit in which the frequency band for Campbell measurement is divided into a plurality of bands in advance, the amount of signals in a certain frequency band is compared with those in other bands, thereby determining that the certain band is abnormal using information (determining conditions) such as information indicating that the amount of signals in a certain band is larger than that in any other band because of the existence of external noise other than detector output pulses, an appropriate band for Campbell measurement is selected from a plurality of frequency bands based on the determination result or the amount of signals for every frequency and signals in the band are selected as normal data. In that case, it is possible to conduct measurement without little influence of noise and to provide a more reliable measurement apparatus.

Moreover, as a method for reducing the influence of noise on Campbell measurement, it is useful to remove the noise component of time series data before converted into frequency band data.

Figure 4:
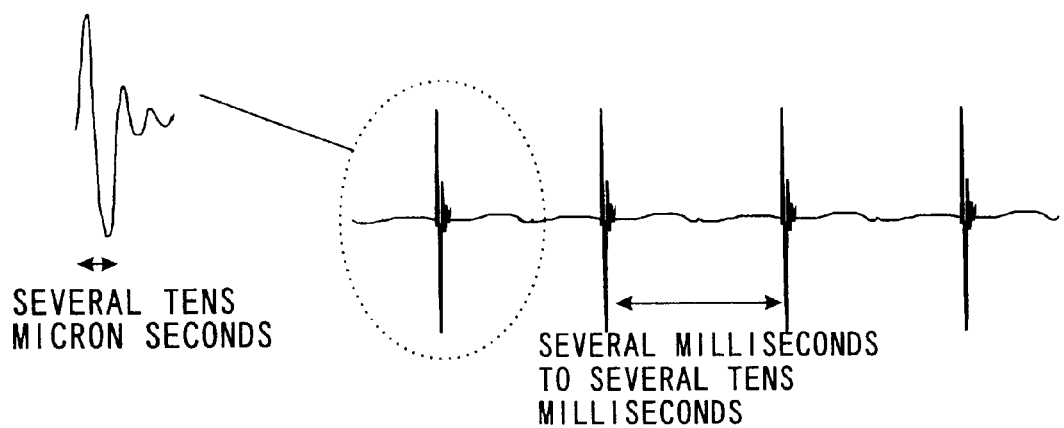
FIG. 4 shows a graph for describing typical example of noise form from inverter.
Figure 5:
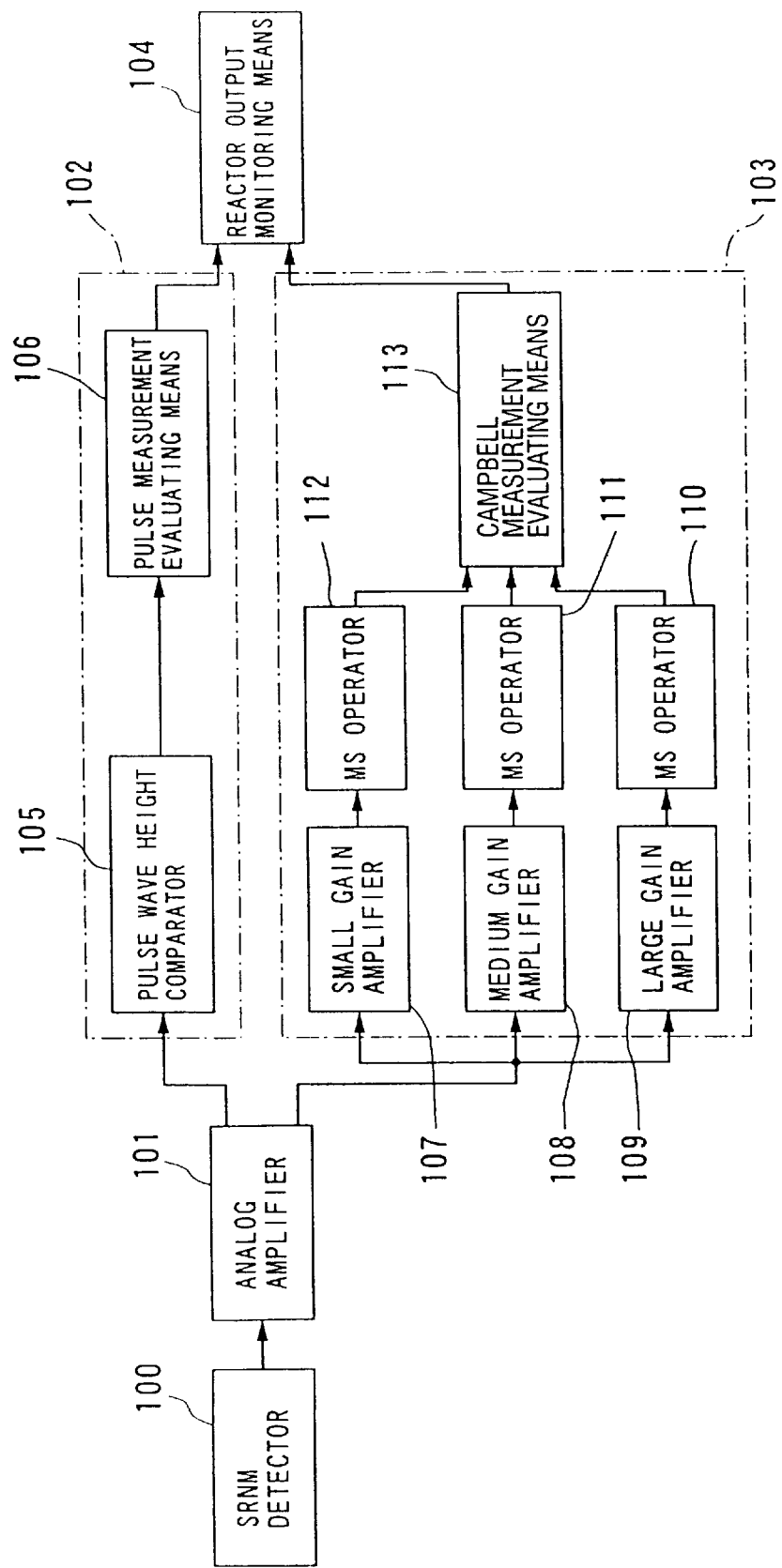
FIG. 5 shows a schematic functional block diagram showing a conventional analog type reactor start-up monitoring apparatus.
Figure 6:
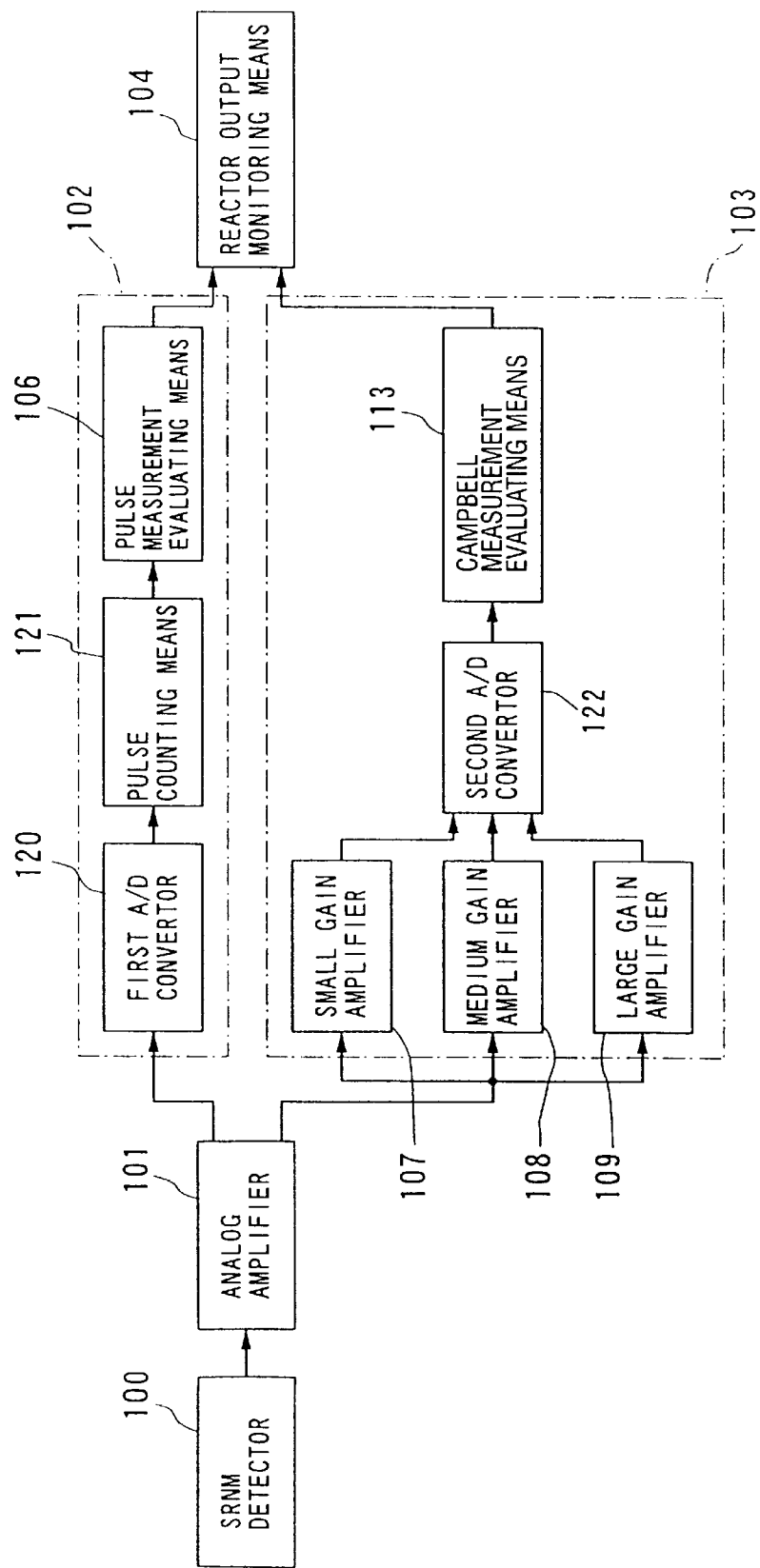
FIG. 6 shows a schematic functional block diagram of a conventional digital type reactor start-up monitoring apparatus.

FIG. 4 shows an example of time series data of the noise induced from the inverter. Namely, in many cases, the surge type noise is induced at several milliseconds' intervals. If the noise is removed while separating frequency bands, the noise cannot be removed for all of the bands since this surge pulse per se includes wide frequency components and all of the frequency bands are influenced by the noise. Obviously, however, the surge components can be discriminated from the time series data.

Thus, it is useful to automatically determine the frequency and timing of the surge noise component and remove the surge noise component from the waveform thereof using the first digital data or the second digital data indicating time series data. In addition, as a determination method, when the detector data is sampled, it is possible that data of not less than or not more than a certain value is set as noise data, that the noise information is added to a digital value and that the noise data is removed in a later operation. The cycle of the inverter noise is several milliseconds and data using sampling data corresponding to the width of the surge pulse (several micron seconds) is recorded on digital data as noise data. It is also useful to adopt a method for monitoring not the measured signal data but other earth wire or the like and obtaining the cycle/timing of the noise data in the digital data based on the cycle and timing of the noise induced thereto.

As stated above, even if data of a certain cycle is removed from the time series data, signal values in frequency bands higher than the frequency of the data of that cycle are corrected by an adjustment coefficient determined by the ratio of the removed data, whereby it is confirmed that the same result is obtained as that of the data which is not removed without any problem. In case of the inverter noise, in particular, its cycle is several milliseconds. While the data used for Campbell measurement is in bands of several hundreds hertz, it is possible to obtain a Campbell measurement value free from the influence of noise by this method and to realize a measurement apparatus free from the influence of noise further.

According to the invention, the cycle/timing of the noise is obtained from the time series data and the result is added to the digital data. Thus, the added data is not used for the operation of the Campbell measurement and measurement without malfunction due to external noise can be made.

According to the invention, the conventional analog measurement means is also provided, whereby the measurement result of the digital type pulse measurement means is compared with that of the analog type measurement means and, therefore, more accurate pulse measurement can be made.

What is claimed is:

1. An apparatus for monitoring reactor power of a reactor at least at the time of startup thereof, comprising:

a radiation sensor for detecting radiation doses associated with the reactor power as electrical signals having pulse components according to the radiation doses;

analog filter means for filtering electrical signals having frequency components in a certain frequency band from the electrical signals detected by the radiation sensor;

digital conversion means for converting the electrical signals having the frequency components filtered by the analog filter means to first digital data with an accuracy of certain bits on sampling intervals shorter than a pulse width of the pulse components;

pulse measurement means for counting the number of pulses of the pulse components in a predetermined frequency band based on the first digital data converted by the digital conversion means;

sum operating means for adding a plurality of sampling values forming the first digital data based on preset sum operation conditions so as to obtain second digital data having accuracy having more bits than those of the plurality of sampling values forming the first digital data converted by the digital conversion means;

Campbell measurement means for calculating mean square values corresponding to power of fluctuation components caused by overlap of the pulse components in a predetermined frequency band based on the second digital data obtained by the sum operating means; and reactor power monitoring means for continuously monitoring the reactor power based on the number of pulses counted by the pulse measurement means and the mean square values calculated by the Campbell measurement means.

2. The apparatus of claim 1, wherein the sum operating means includes means for outputting the second digital data to the Campbell measurement means with output accuracy of more bits than those of the first digital data.

3. The apparatus of claim 1, wherein the sum operating means includes means for outputting the second digital data to the Campbell measurement means at longer output time intervals than sampling intervals for the digital conversion means.

4. The apparatus of claim 1, wherein the sum operating means is means for adding a plurality of sampling values forming the first digital data under a plurality of sum operating conditions having different numbers of added values as the sum operation conditions.

5. The apparatus of claim 1, wherein the sum operating means is means for adding a plurality of sampling values forming the first digital data under a plurality of sum operating conditions within a certain time as the sum operation conditions.

6. The apparatus of claim 1, wherein the Campbell measurement means includes Campbell output evaluating means for evaluating the mean square values in a plurality of frequency bands based on the second digital data from the sum operating means, and Campbell signal discriminating means for selecting normal values from the mean square values in the plurality of frequency bands by the Campbell output evaluating means and supplying the normal values to the reactor power monitoring means as information on the reactor power.

7. The apparatus of claim 1, wherein the digital conversion means is means for converting the electrical signals having the frequency components from the analog filter means to the first digital data at sampling intervals corresponding to 1/n of the pulse width of the pulse components, where n is a positive number; and wherein the pulse measurement means includes means for obtaining an operation value Out(k) at the sampling intervals, selecting the pulse components based on the Out(k), and counting the number of pulses of the pulse components selected, the Out(k) being operated based on the following formula;

$$Out(k)=C(0) \times S(k)+C(1) \times S(k-1)+C(2) \times S(k-2)+ \ldots +C(k-n+1) \times S(k-n+1),$$

where $S(k)$ is a k-th sampling value among a plurality of sampling values forming the first digital data from the digital conversion means, $S(k-1)$, $S(k-2)$, ..., $S(k-n+1)$ are sequential sampling values before the $S(k)$, the number of the sampling values is determined by said positive number n, and $C(0)$, $C(1)$, $C(2)$, ..., $C(k-n+1)$ are constants individually allotted to the sampling values $S(k)$, $S(k-1)$, $S(k-2)$, ..., $S(k-n+1)$.

8. The apparatus of claim 1, wherein the digital conversion means is means for converting the electrical signals having the frequency components from the analog filter means to the first digital data at sampling intervals, the sampling intervals being not less than one fourth and not more than one third of the pulse width of the pulse components, and wherein the pulse measuring means includes means for obtaining an operation value Out(k) at the sampling intervals, selecting the pulse components based on the Out(k), and counting the number of pulses of the pulse components selected, the Out(k) being operated based on the following formula;

$$Out(k)=-a \times S(k-3)+b \times S(k-2)+c \times S(k-1)-d \times S(k),$$

where $S(k)$ is a k-th sampling value among a plurality of sampling values forming the first digital data from the digital conversion means, $S(k-1)$, $S(k-2)$ and $S(k-3)$ are sequential three sampling values before the $S(k)$, and a, b, c and d are constants individually allotted to the four sampling values $S(k)$, $S(k-1)$, $S(k-2)$ and $S(k-3)$.

9. The apparatus of claim 1, wherein the digital conversion means is means for converting the electrical signals having the frequency components from the analog filter means to the first digital data at sampling intervals, the sampling intervals being not less than one third of and not more than a half of the pulse width of the pulse components and wherein the pulse measuring means includes means for obtaining an operation of value Out(k) at the sampling intervals, selecting the pulse components based on the Out(k), and counting the number of pulses of the pulse components selected, the Out(k) being operated based on the following formula;

$$Out(k)=-a \times S(k-2)+2 \times b \times S(k-1)-c \times S(k),$$

where $S(k)$ is a k-th sampling value among a plurality of sampling values forming the first digital data from the digital conversion means, $S(k-1)$ and $S(k-2)$ are sequentially two sampling values before the $S(k)$, and a, b and c:are constants individually allotted to the three sampling values $S(k)$, $S(k-1)$ and $S(k-2)$.

10. The apparatus of claim 1, wherein the pulse measurement means comprises:

analog type pulse comparison means used if a wave height value is not less than or not more than a predetermined value; and digital type pulse determination means for counting the number of pulses of the pulse components detected by the radiation sensor based on the first digital data converted by the digital conversion means; and means for counting only the number of pulses removed noise components from the pulse components detected by the radiation sensor based on both the analog type pulse comparison means and the digital type pulse determination means.

11. The apparatus of claim 1, wherein the digital conversion means is means for converting the electrical signals having the frequency components from the analog filter means to the first digital data at sampling intervals, the sampling intervals being 1/n of the pulse width of the pulse components, where n is a positive number; and wherein the pulse measuring means includes means for obtaining a first and second operation values Out 1(k) and Out 2(k) at the sampling intervals, selecting the pulse components based on the Out 1(k) and Out 2(k), and counting the number of pulses of the pulse components selected, the Out 1(k) and Out 2(k) being operated based on the following formula;

$$\text{Out } 1(k) = C(0) \times S(k) + C(1) \times S(k-1) + C(2) \times S(k-2) + \ldots + C(k-n+1) \times S(k-n+1)$$

$$\text{Out } 2(k) = D(0) \times S(k) + D(1) \times S(k-1) + D(2) \times S(k-2) + \ldots + D(k-n+1) \times S(k-n+1),$$

where S(k) is a k-th sampling value among a plurality of sampling values forming the first digital data from the digital conversion means, S(k−1), S(k−2), . . . , S(k−n+1) are sequential sampling values before the sampling value S(k), the number of the sampling values is determined by said positive number n, C(0), C(1), C(2), . . . , C(k−n+1) are first constants individually allotted to the sampling values S(k), S(k−1), S(k−2), . . . , S(k−n+1), and D(0), D(1), D(2), D(3), . . . , D(k−n+1) are second constants individually allotted to the sampling values S(k), S(k−1), S(k−2), . . . , S(k−n+1).

12. The apparatus of claim 11, wherein the obtaining means is means for obtaining a plurality of operation values including third or following operation values in addition to the first and the second operation values, based on the same formula as in the case of obtaining the first and second operation values at the sampling intervals while changing the constants.

13. The apparatus of claim 1, wherein the Campbell measurement means comprises:

cycle data removal means for removing data of a predetermined time interval from the second digital data acquired by the sum operating means; and Campbell evaluating means for operating the mean square value from residue data not removed by the cycle data removal means in a frequency band higher than a frequency band of the data removal cycle and correcting and outputting the mean square value operated in accordance with a ratio of data removed from the second digital data.

14. The apparatus of claim 13, wherein the cycle data removal means comprises:

noise data addition means for discriminating data of not less than or not more than a predetermined value by the digital conversion means, determining the data as noise data and adding noise information on the noise data; and Campbell evaluating means for removing the data if the noise information is included in the second digital data and correcting and outputting a mean square value of the noise data in accordance with the ratio of the removed data to the second digital data.

15. The apparatus of claim 13, wherein the cycle data removal means comprises:

noise monitoring means for evaluating the presence or absence of noise induced by an earth or the like and a cycle of the noise; and Campbell evaluating means for removing the noise data from the second digital data if the noise information is included in the second digital data in accordance with the noise cycle evaluated by the noise monitoring means and noise recognition timing, and correcting and outputting a mean square value of the removed data in accordance with the ratio of the removed data to the second digital data.

* * * * *